US009428133B2

(12) United States Patent
Eigenmann et al.

(10) Patent No.: US 9,428,133 B2
(45) Date of Patent: Aug. 30, 2016

(54) MOTOR VEHICLE WITH AN AIRBAG MODULE

(71) Applicant: Bayerische Motoren Werke Aktiengesellschaft, Munich (DE)

(72) Inventors: Martin Eigenmann, Landshut (DE); Christian Maurer, Karlsdorf/Forstern (DE); Robert Janssen, Munich (DE); Dienhung Huynh, Landshut-Auloh (DE); Reinhold Schreff, Postau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/639,224

(22) Filed: Mar. 5, 2015

(65) Prior Publication Data

US 2015/0175117 A1 Jun. 25, 2015

Related U.S. Application Data

(63) Continuation of application No. PCT/EP2013/067428, filed on Aug. 22, 2013.

(30) Foreign Application Priority Data

Sep. 6, 2012 (DE) ........................ 10 2012 215 853

(51) Int. Cl.
*B60R 21/205* (2011.01)
*B60R 21/217* (2011.01)
*B60R 21/00* (2006.01)

(52) U.S. Cl.
CPC .......... *B60R 21/205* (2013.01); *B60R 21/217* (2013.01); *B60R 21/2171* (2013.01); *B60R 2021/0004* (2013.01)

(58) Field of Classification Search
CPC . B60R 21/205; B60R 21/206; B60R 21/217; B60R 21/2171; B60R 21/20
USPC ............................................... 280/728.2, 732
See application file for complete search history.

(56) References Cited

U.S. PATENT DOCUMENTS

2004/0041370 A1 3/2004 Hier et al.
2004/0145164 A1* 7/2004 North .................. B60R 21/2165
280/732

(Continued)

FOREIGN PATENT DOCUMENTS

DE 103 46 012 A1 7/2004
DE 103 07 480 A1 9/2004

(Continued)

OTHER PUBLICATIONS

International Search Report (PCT/ISA/210) dated Oct. 30, 2013 with English translation (seven pages).

(Continued)

*Primary Examiner* — Keith Frisby
(74) *Attorney, Agent, or Firm* — Crowell & Moring LLP

(57) ABSTRACT

An airbag housing can be detachably fixed to at least one abutting wall area via at least one fixing device. The airbag housing has a plurality of tongues protruding laterally outwards on at least two opposing sides. The tongues arranged next to one another on one side are each spaced from the next by the width of at least one tongue. For the tongues of the airbag housing, a fixing frame on the dashboard has corresponding undercuts, and therefore the fixed airbag module is connected to the tongues in a form-locking manner in the undercuts.

17 Claims, 2 Drawing Sheets

(56) References Cited

U.S. PATENT DOCUMENTS

2010/0259032 A1   10/2010   Rick et al.
2012/0007346 A1   1/2012    Morawietz et al.

FOREIGN PATENT DOCUMENTS

| DE | 10 2006 055 909 A1 | 5/2008 |
| DE | 10 2007 046 212 A1 | 4/2009 |
| EP | 2 062 790 A1 | 5/2009 |
| WO | WO 2008/105694 A1 | 9/2008 |
| WO | WO 2010/091819 A1 | 8/2010 |

OTHER PUBLICATIONS

German Search Report dated Jul. 9, 2013 with partial English translation (10 pages).

* cited by examiner

MOTOR VEHICLE WITH AN AIRBAG MODULE

CROSS REFERENCE TO RELATED APPLICATIONS

This application is a continuation of PCT International Application No. PCT/EP2013/067428, filed Aug. 22, 2013, which claims priority under 35 U.S.C. §119 from German Patent Application No. 10 2012 215 853.7, filed Sep. 6, 2012, the entire disclosures of which are herein expressly incorporated by reference.

This application contains subject matter related to U.S. application Ser. No. 14/639,225, entitled "Motor Vehicle with an Airbag Module" filed on Mar. 5, 2015.

BACKGROUND AND SUMMARY OF THE INVENTION

The invention relates to a motor vehicle with an airbag module which has at least one airbag and at least one gas generator, which are accommodated in an airbag housing. The airbag module is fixable with the airbag housing on a fixing frame, which is connected with a wall section of a dashboard.

From German Patent document DE 103 46 012 A1, a motor vehicle having an airbag module is known, which has at least one airbag and at least one gas generator, which are accommodated in an airbag housing. The airbag housing can be detachably fixed to at least one adjoining wall area by way of at least one fixing device. The fixing device is constructed as a push-in and slide connection according to the keyhole principle.

It is an object of the invention to provide a motor vehicle having an airbag which can be fixed in a simple manner to an adjoining wall area.

This and other objects are achieved, according to the invention, by providing an airbag module of a motor vehicle having at least one airbag and at least one gas generator, which are accommodated in an airbag housing. This airbag module can be fixed with the airbag housing on a fixing frame, which is connected with a dashboard of the motor vehicle. For this purpose, the airbag housing has a plurality of laterally outward-projecting tongues on at least two opposite sides. The tongues are arranged side-by-side. On one side, each tongue is spaced with respect to the other by at least one tongue width. The tongues extend essentially in the plane of the fixing frame. The fixing frame has corresponding undercuts for the tongues of the airbag housing, so that the fixed airbag module is form-lockingly held in the undercuts by way of the tongues. The fixing frame may have edge sections for that purpose, which extend perpendicularly with respect to the plane of the fixing frame. These edge sections can then have the undercuts for the tongues of the airbag housing.

The undercuts are formed, for example, by recesses in the respective edge sections. One tongue respectively can then be held in a recess. For the fixing at the fixing frame, the airbag housing can preferably be slid in the longitudinal direction of the two mutually opposite sides with the tongues into the undercuts. In this case, the tongues and the undercuts are ideally arranged with respect to one another such that the airbag housing can be placed on the fixing frame such that, viewed in the longitudinal direction, the tongues in each case come to be situated precisely between two undercuts. As a result, for the fixing, the airbag housing has to be displaced approximately only by the width of one tongue in the longitudinal direction, in order to form-lockingly mount the airbag module on the fixing frame.

Advantageously, the airbag housing fixed to the fixing frame can additionally be screwed by way of at least one screw to the fixing frame. This at least one screw ensures that the airbag module slid into its form-locking fixing position cannot shift undesirably.

This type of fixing of the airbag module requires very little mounting time. It is process-reliable and dependable. No additional components are required.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
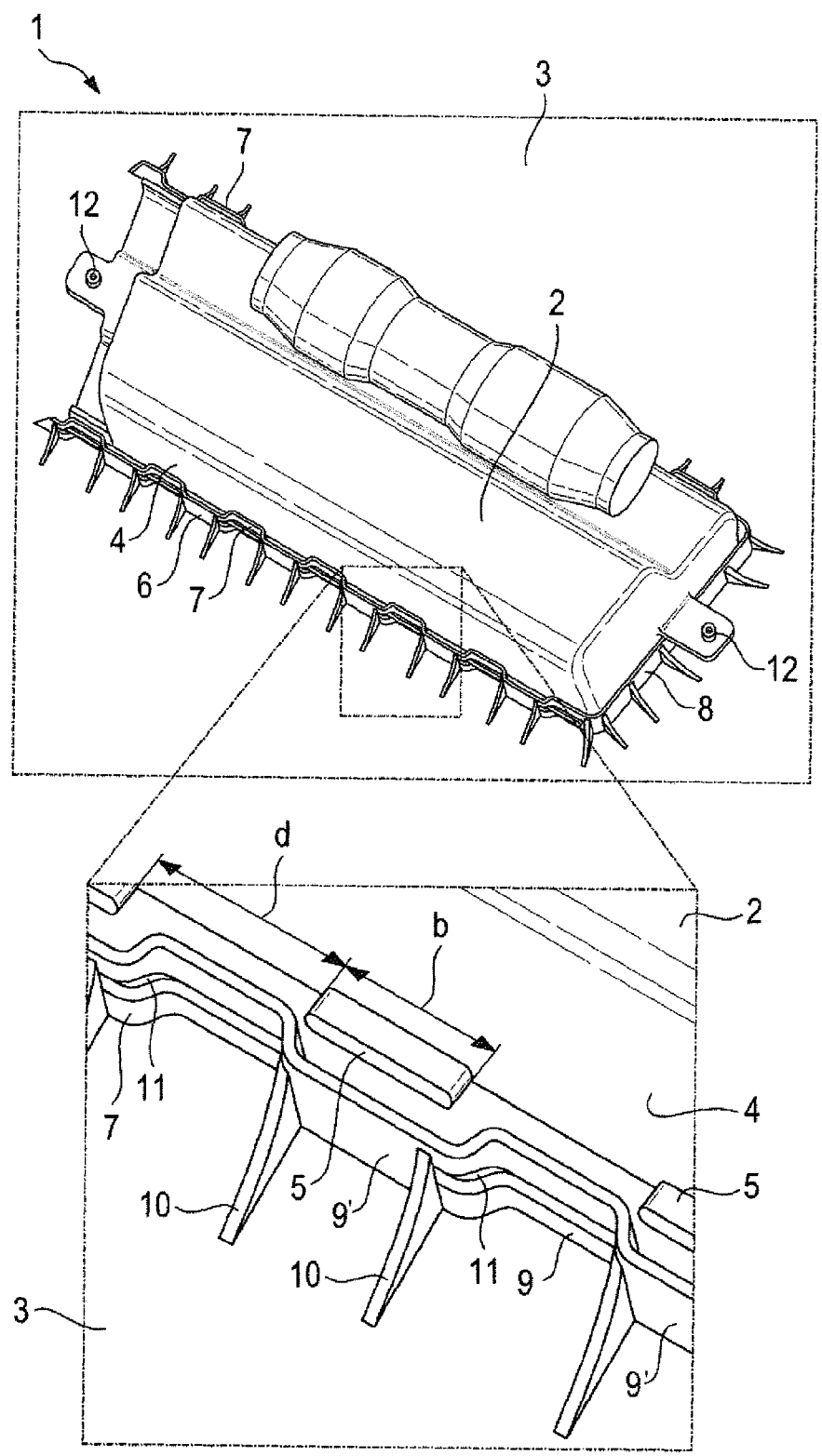
FIG. 1 is a schematic view of an airbag module of a motor vehicle, which is placed on a fixing frame, including a view of an enlarged detail.

FIG. 1 illustrates an airbag module 1, which consists of an airbag housing 2, in which at least one airbag and at least one gas generator are accommodated. The airbag is used as a front passenger airbag which is accommodated in a dashboard on the front passenger side. In the event of an accident, the airbag can pass through a wall section of the dashboard facing the front passenger and deploy in front of the front passenger. The airbag module 1 is mounted by way of the airbag housing 2 in the dashboard on the wall section facing the front passenger. The forces acting when the airbag is triggered are fairly high. Correspondingly, the stress acting upon the connection between the airbag housing 2 and the wall section 3 of the dashboard is also high.

The airbag housing 2 has an oblong shape with two mutually parallel extending longitudinal edges 4. A plurality of tongues 5 each project laterally toward the outside from these mutually opposite longitudinal edges 4. Along its longitudinal dimension, each longitudinal edge 4 has a plurality of, in each case, equally wide tongues 5 arranged at uniform distances from one another. In this case, the distance d between two tongues 5 is greater than the width b of the tongues 5. All tongues 5 of the airbag housing 2 are situated in a plane.

For accommodating the airbag housing 2, a fixing frame 6 is injection-molded to the interior side of the wall section 3. From the vehicle interior, the passengers always see only the exterior side of the wall section 3. The fixing frame 6 also extends in a plane. It is used for fixing the airbag housing 2 as well as increasing the stiffness of the wall section 3 of the dashboard in the area of the front passenger airbag.

The fixing frame 6 consists of two mutually opposite side edges 7, whose ends are mutually connected by way of a transverse section 8. In this case, the side edges 7 and the transverse section 8 project perpendicularly in the manner of a web with respect to the plane of the fixing frame 6 from the wall section 3 of the dashboard. In their longitudinal dimension, the side edges 7 each alternately have edge sections 9 which are slightly offset toward the inside into the frame center, and edge sections 9' which are slightly offset toward the outside. The edge sections 9 offset toward the inside and the edge sections 9' offset toward the outside are in each case connected with one another. They alternate in a labyrinthine manner over the longitudinal dimension of the side edges 7. In addition, for increasing the stiffness, the edge sections 9' offset toward the outside are in each case connected by way of two additional supports 10 with the wall section 3 of the dashboard. In this case, the length of the edge sections 9' offset toward the outside is slightly greater than the width b of the tongues 5. The edge sections 9 offset toward the inside each have a longitudinal slot 11 which extends along the entire longitudinal dimension of the edge section 9 offset toward the inside. The width of these longitudinal slots 11 in the edge sections 9 offset toward the inside corresponds approximately to the thickness of the tongues 5.

The fixing frame 6 is precisely coordinated with the airbag housing 2. For the mounting—as illustrated in FIG. 1—the airbag housing 2 can be placed on the wall section 3 of the dashboard in such a manner that the tongues 5 of the longitudinal edges 4 of the airbag housing 2 each come to be situated precisely in the area of the outwardly offset edge sections 9' of the side edges 7 of the fixing frame. The distance between the inwardly offset edge sections 9 is too small for the airbag housing 2; here, the airbag housing 2 could not be placed on the wall section 3.

Figure 2:
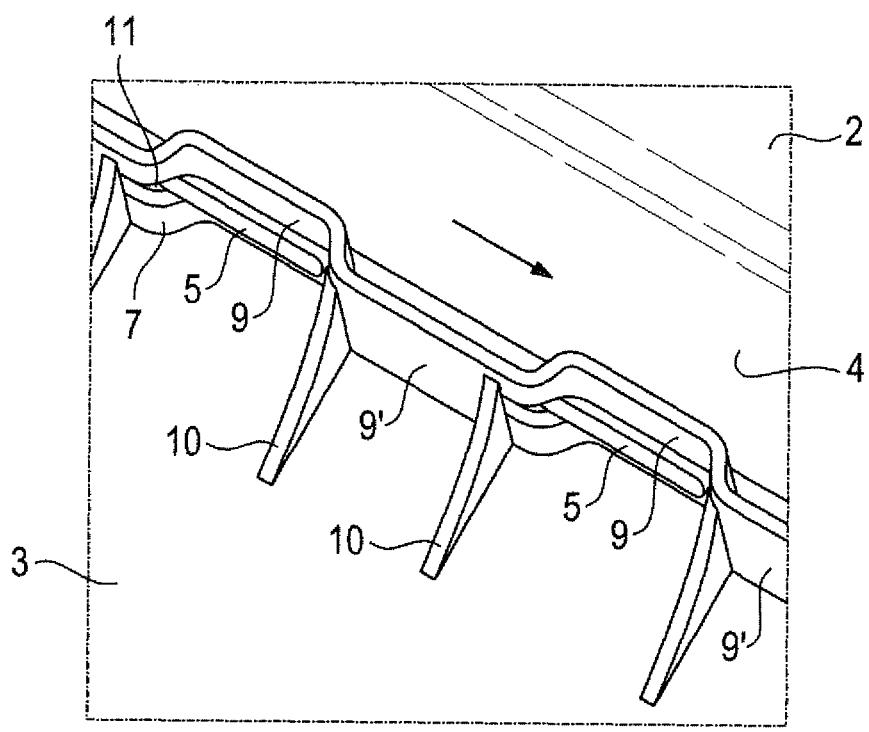
FIG. 2 is view of an enlarged detail of the airbag module, which is form-lockingly held by the fixing frame.

For the secure fixing of the airbag housing 2, the latter is now displaced from the position, in which it is placed on the wall section 3 illustrated in FIG. 1, in the longitudinal direction of the airbag housing 2 approximately by the width b of one tongue 5. In this case, the tongues 5 slide into the longitudinal slots 11 of the inwardly offset edge sections 9 of the side edges 7, as illustrated in FIG. 2. In this position, the airbag housing 2 is form-lockingly held by way of the tongues 5 in the longitudinal slots 11 at the fixing frame 6 and thereby at the wall section 3 of the dashboard. This represents a very simple and robust method for fixing an airbag module 1 at a wall section 3.

While the motor vehicle is driven, the airbag module 1 could, however, undesirably shift relative to the fixing frame as result of shaking. In order to avoid this situation, after having been slid into the form-locking position, the airbag housing will be screwed on both sides, by use of at least one screw 12, respectively, to the fixing frame, so that it can no longer shift relative to the latter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, having an airbag module with at least one airbag and at least one gas generator comprising:
   an airbag housing that accommodates the at least one airbag and the at least one gas generator;
   a fixing frame located on a wall section of a dashboard of the motor vehicle, the airbag housing being fixable on the fixing frame, wherein
   the airbag housing comprises a plurality of laterally outward-projecting tongues on at least two opposing sides, the tongues arranged next to one another on one side being spaced apart by at least one tongue width,
   the fixing frame has corresponding undercuts with respect to the tongues, the airbag module being held form-lockingly via the tongues in the corresponding undercuts,
   the airbag housing is slid in a longitudinal direction of the airbag housing so that the tongues slide into the undercuts, to thereby fix the airbag housing at the fixing frame.

2. The motor vehicle according to claim 1, wherein all tongues on a side are situated in a common plane.

3. The motor vehicle according to claim 2, wherein the fixing frame has at least two mutually opposing side edges, the mutually opposing side edges projecting perpendicularly in a web manner from the wall section of the dashboard with respect to a plane of the fixing frame.

4. The motor vehicle according to claim 3, wherein each opposing side edge, in a longitudinal dimension, has edge sections alternately offset inward toward a center of the fixing frame and outward toward an exterior of the fixing frame.

5. The motor vehicle according to claim 4, wherein the inwardly offset edge sections each comprise a longitudinal slot forming a respective undercut for a respective tongue.

6. The motor vehicle according to claim 5, wherein a width of the longitudinal slot corresponds to a thickness of a tongue.

7. The motor vehicle according to claim 6, wherein, in each case, the longitudinal dimension of the outwardly offset edge section is greater than the width of one tongue.

8. The motor vehicle according to claim 1, further comprising at least one threaded fastener to additionally secure the form-lockingly fixed airbag housing to the fixing frame.

9. The motor vehicle according to claim 1, wherein
   a region of the fixing frame that cooperates with the opposing sides of the airbag housing has an alternating configuration in which a first geometric shape is, along a longitudinal direction of the fixing frame, displaced longitudinally from and immediately adjacent to a second geometric shape, and
   the first and second geometric shapes have shapes that are complementary to one another.

10. A mounting structure for an airbag module of a vehicle, comprising:
    a housing in which is accommodated at least one airbag;
    a fixing frame of a wall section of a vehicle dashboard, wherein
    the airbag housing has a plurality of tongues protruding laterally outward on at least two opposing sides, the tongues on each side being spaced from one another by at least one tongue width,
    the fixing frame of the wall section comprising undercuts corresponding with the plurality of tongues, and
    the housing being held form-lockingly via the tongues of the housing engaging in the corresponding undercuts of the fixing frame, by sliding of the airbag housing along a longitudinal direction of the airbag housing.

11. The mounting structure according to claim 10, wherein the plurality of tongues on each opposing side are situated in a common plane.

12. The mounting structure according to claim 11, wherein the fixing frame comprises two mutually opposing side edges projecting perpendicularly in a web manner from the wall section relative to a plane of the fixing frame.

13. The mounting structure according to claim 12, wherein the mutually opposing side edges comprise alternating inwardly offset and outwardly offset edge sections relative to a center of the fixing frame, each inwardly offset edge section comprising a longitudinal slot forming the undercut for a corresponding tongue.

14. The mounting structure according to claim 12, wherein a width of the longitudinal slot corresponds to a thickness of the tongue.

15. The mounting structure according to claim 13, wherein a longitudinal length of the outwardly offset edge sections is greater than a width of a tongue.

16. The mounting structure according to claim 10, wherein
- a region of the fixing frame that cooperates with the opposing sides of the airbag housing has an alternating configuration in which a first geometric shape is, along a longitudinal direction of the fixing frame, displaced longitudinally from and immediately adjacent to a second geometric shape, and
- the first and second geometric shapes have shapes that are complementary to one another.

17. A motor vehicle, having an airbag module with at least one airbag and at least one gas generator comprising:
an airbag housing that accommodates the at least one airbag and the at least one gas generator;
a fixing frame located on a wall section of a dashboard of the motor vehicle, the airbag housing being fixable on the fixing frame, wherein
the airbag housing comprises a plurality of laterally outward-projecting tongues on at least two opposing sides thereof,
a region of the fixing frame that cooperates with the opposing sides of the airbag housing has an alternating configuration in which a first geometric shape is, along a longitudinal direction of the fixing frame, displaced longitudinally from and immediately adjacent to a second geometric shape, and
the first and second geometric shapes have shapes that are complementary to one another.

* * * * *